US009623972B2

(12) United States Patent
Maslakow

(10) Patent No.: US 9,623,972 B2
(45) Date of Patent: Apr. 18, 2017

(54) METHOD AND APPARATUS FOR COMPOSITE THERMOPLASTIC ARM REST ASSEMBLY

(71) Applicant: Reliant Worldwide Plastics, LLC, Plano, TX (US)

(72) Inventor: William H. Maslakow, Plano, TX (US)

(73) Assignee: Reliant Worldwide Plastics, LLC, Plano, TX (US)

(*) Notice: Subject to any disclaimer, the term of this patent is extended or adjusted under 35 U.S.C. 154(b) by 0 days.

(21) Appl. No.: 14/736,643

(22) Filed: Jun. 11, 2015

(65) Prior Publication Data

US 2015/0360784 A1 Dec. 17, 2015

Related U.S. Application Data

(60) Provisional application No. 62/012,677, filed on Jun. 16, 2014.

(51) Int. Cl.
| | | |
|---|---|---|
| *B64D 11/06* | (2006.01) | |
| *B29C 45/14* | (2006.01) | |
| *B29K 101/12* | (2006.01) | |
| *B29L 31/30* | (2006.01) | |
| *B60N 2/46* | (2006.01) | |

(52) U.S. Cl.
CPC ...... *B64D 11/0644* (2014.12); *B64D 11/0646* (2014.12); *B29C 45/14311* (2013.01); *B29K 2101/12* (2013.01); *B29L 2031/3026* (2013.01); *B60N 2/46* (2013.01)

(58) Field of Classification Search
CPC ...... B60N 2/46; B60N 2/4606; B60N 2/4626; B60N 2/4633; B60N 2/4673; B60N 2/468; A47C 7/54; A47C 7/543; A47C 7/546; B64D 11/0644; B64D 11/0646; B29C 45/14311; B29K 2101/12; B29L 2031/3026

See application file for complete search history.

(56) References Cited

U.S. PATENT DOCUMENTS

| | | |
|---|---|---|
| 2,064,435 A | 12/1936 | Loeffler |
| 3,323,656 A | 6/1967 | Weiss et al. |
| 4,159,071 A | 6/1979 | Roca |
| 4,339,488 A | 7/1982 | Brokmann |

(Continued)

FOREIGN PATENT DOCUMENTS

| | | |
|---|---|---|
| CA | 2258068 A1 | 7/1999 |
| CA | 2569596 A1 | 12/2005 |

(Continued)

OTHER PUBLICATIONS

U.S. Appl. No. 14/979,161, Maslakow.

(Continued)

*Primary Examiner* — Philip Gabler
(74) *Attorney, Agent, or Firm* — Winstead PC

(57) ABSTRACT

An arm rest assembly that includes a thermoplastic arm rest body that defines an internal cavity and a support structure disposed within the internal cavity. The support structure is chemically compatible with the thermoplastic arm rest body such that a homogeneous chemical bond is formed between the support structure and the thermoplastic arm rest body. An arm rest cover is coupled to the arm rest body such that the internal cavity is enclosed by the arm rest body and the arm rest cover.

10 Claims, 9 Drawing Sheets

(56) References Cited

U.S. PATENT DOCUMENTS

| | | | |
|---|---|---|---|
| 4,405,669 A | 9/1983 | Pott | |
| 4,837,251 A | 6/1989 | Okey et al. | |
| 4,933,131 A | 6/1990 | Okey et al. | |
| 5,049,342 A | 9/1991 | Scanlon et al. | |
| 5,141,816 A * | 8/1992 | Walker | C08J 5/12 428/420 |
| 5,233,743 A * | 8/1993 | Robertson | A61G 5/00 156/304.5 |
| 5,551,755 A | 9/1996 | Lindberg | |
| 5,727,357 A | 3/1998 | Arumugasaamy et al. | |
| 5,769,496 A * | 6/1998 | Gryp | A47C 1/03 297/411.32 |
| 5,871,207 A | 2/1999 | Yoshida | |
| 6,899,363 B2 | 5/2005 | Dry | |
| 6,966,533 B1 | 11/2005 | Kalis et al. | |
| 7,005,092 B2 | 2/2006 | Dooley et al. | |
| 7,357,443 B2 | 4/2008 | Wolff et al. | |
| 7,926,879 B2 * | 4/2011 | Schmitz | A47C 1/03255 297/340 |
| 8,132,861 B2 * | 3/2012 | Cone | B60N 2/4646 297/411.32 |
| 8,505,997 B2 | 8/2013 | Hipshier et al. | |
| 8,567,839 B2 | 10/2013 | Kalus et al. | |
| 8,596,206 B2 | 12/2013 | Legeay | |
| 2002/0074688 A1 | 6/2002 | Smith et al. | |
| 2004/0007791 A1 | 1/2004 | Lenferink et al. | |
| 2004/0118853 A1 | 6/2004 | Schaal et al. | |
| 2005/0140157 A1 | 6/2005 | Emerling | |
| 2005/0201080 A1 | 9/2005 | Seward | |
| 2006/0097544 A1 | 5/2006 | Cowelchuk et al. | |
| 2007/0101671 A1 | 5/2007 | Deeks | |
| 2007/0207292 A1 | 9/2007 | Cowelchuk et al. | |
| 2007/0262632 A1 * | 11/2007 | Cody | B60N 2/4646 297/411.35 |
| 2008/0023600 A1 | 1/2008 | Perlman | |
| 2008/0136230 A1 | 6/2008 | Ling | |
| 2008/0277987 A1 | 11/2008 | Deadrick | |
| 2009/0174234 A1 | 7/2009 | Vignal et al. | |
| 2009/0196597 A1 | 8/2009 | Messinger et al. | |
| 2011/0127812 A1 * | 6/2011 | DeVoe | B60N 2/4606 297/188.19 |
| 2011/0155854 A1 | 6/2011 | Bakker et al. | |
| 2011/0204683 A1 | 8/2011 | Roy et al. | |
| 2011/0278885 A1 | 11/2011 | Procter et al. | |
| 2011/0316320 A1 | 12/2011 | Kulkarni et al. | |
| 2012/0181839 A1 | 7/2012 | Michalak et al. | |
| 2012/0306241 A1 | 12/2012 | Winter et al. | |
| 2012/0325123 A1 | 12/2012 | Schoerkhuber et al. | |
| 2013/0004696 A1 | 1/2013 | Volgers et al. | |
| 2013/0011623 A1 | 1/2013 | Jones et al. | |
| 2013/0082156 A1 | 4/2013 | Conner | |
| 2013/0119727 A1 | 5/2013 | Lavelle et al. | |
| 2013/0122246 A1 | 5/2013 | Berger et al. | |
| 2013/0169011 A1 | 7/2013 | Evans | |
| 2013/0320742 A1 | 12/2013 | Murolo et al. | |
| 2014/0077531 A1 | 3/2014 | Preisler et al. | |
| 2014/0183238 A1 | 7/2014 | Lin | |
| 2014/0198473 A1 | 7/2014 | Shah et al. | |
| 2014/0261097 A1 | 9/2014 | Eilers et al. | |
| 2015/0068435 A1 | 3/2015 | Maslakow | |
| 2015/0197075 A1 | 7/2015 | Yizze, III et al. | |
| 2015/0314501 A1 | 11/2015 | Maslakow | |
| 2015/0336495 A1 | 11/2015 | Maslakow | |
| 2016/0375618 A1 | 12/2016 | Maslakow et al. | |

FOREIGN PATENT DOCUMENTS

| | | |
|---|---|---|
| CA | 2641166 A1 | 4/2010 |
| CH | 362224 A | 5/1962 |
| DE | 102008057220 B4 | 8/2013 |
| EP | 0030522 A2 | 6/1981 |
| EP | 0048055 A2 | 3/1982 |
| EP | 0492129 A1 | 7/1992 |
| EP | 0928804 A1 | 7/1999 |
| EP | 1424424 A1 | 6/2004 |
| EP | 1685009 A1 | 8/2006 |
| EP | 1820394 A1 | 8/2007 |
| EP | 2338768 A1 | 6/2011 |
| EP | 2608493 A1 | 6/2013 |
| EP | 2660048 A1 | 11/2013 |
| JP | S5642950 A | 4/1981 |
| JP | H06170889 A | 6/1994 |
| WO | WO-0172861 A2 | 10/2001 |
| WO | WO-2005049391 A1 | 6/2005 |
| WO | WO-2008/065446 A1 | 6/2008 |
| WO | WO-2009053573 A2 | 4/2009 |
| WO | WO-2009/156754 A1 | 12/2009 |
| WO | WO-2011120717 A1 | 10/2011 |
| WO | WO-2013021485 A1 | 2/2013 |
| WO | WO-2013036848 A1 | 3/2013 |
| WO | WO-2013144351 A1 | 10/2013 |
| WO | WO-2013187767 A1 | 12/2013 |
| WO | WO-2013187768 A1 | 12/2013 |
| WO | WO-2014058884 A1 | 4/2014 |
| WO | WO-2015038630 A1 | 3/2015 |

OTHER PUBLICATIONS

U.S. Appl. No. 14/048,840, Maslakow et al.
U.S. Appl. No. 14/482,623, Maslakow.
U.S. Appl. No. 14/703,208, Maslakow.
U.S. Appl. No. 14/719,668, Maslakow.
Copenheaver, Blaine R.; "International Search Report" prepared for PCT/US2014/054968 as mailed Dec. 19, 2014, 2 pages.
Mans, Peter; "International Search Report" prepared for PCT/US2013/063887 as mailed Dec. 20, 2013; 4 pages.
Mans, Peter; "Written Opinion of the International Searching Authority" for International Application No. PCT/US2013/063887 as mailed Dec. 20, 2013; 10 pages.
Accessory Power; "TabGRAB Tablet Car Headrest Mount Holder with Reindorced No-Slip Display Design for Samsung Galaxy Tab 3 10.1/Acer Iconia ASUS MeMO Pad FHD 10, VivoTab RT & More 10-inch Tablets"; http://www.amazon.com/gp/product/B005ISU7ZW?ie=UTF8&ref_de_a_smtd&showDetailTechData=1#technical-data; Nov. 2, 2011; 6 pages.
U.S. Appl. No. 15/178,386, Maslakow.

* cited by examiner

METHOD AND APPARATUS FOR COMPOSITE THERMOPLASTIC ARM REST ASSEMBLY

CROSS-REFERENCE TO RELATED APPLICATIONS

This application claims the priority to, and incorporates by reference for any purpose, the entire disclosure of, U.S. Provisional Patent Application No. 62/012,677, filed Jun. 16, 2014.

BACKGROUND

Field of the Invention

The present invention relates generally to seats for commercial aircraft and more particular, but not by way of limitation, to a homogeneous thermoplastic arm rest assembly formed via homogeneous chemical bonding of thermoplastic components.

History of the Related Art

In the commercial aircraft industry, weight and safety are important issues. Even non-structural and non-critical elements such as, for example, arm rests on a commercial aircraft are designed with these issues in mind. For example, a weight savings on each arm rest can add up to significant weight savings for the aircraft as a whole due, in no small part to the large number of seats. The weight saving in turn may reduce then fuel expenditure and provide a cost savings. In the specific case of arm rests, any such weight reduction must not adversely affect strength. Typically, governmental rules and regulations specify strength requirements for aircraft elements, and at the very least, strength issues may impact durability and expected lifespan of an element, such as an arm rest. Cost is also a driving factor in the commercial aircraft industry, so low-cost manufacturing techniques may be important as well. Disclosed embodiments herein relate to improved arm rest embodiments that may address one or more of these issues.

SUMMARY

The present invention relates generally to seats for commercial aircraft and more particular, but not by way of limitation, to a homogeneous thermoplastic arm rest assembly formed via homogeneous chemical bonding of thermoplastic components. In one aspect, the present invention relates to an arm rest assembly that includes a thermoplastic arm rest body that defines an internal cavity and a support structure disposed within the internal cavity. The support structure is chemically compatible with the thermoplastic arm rest body such that a homogeneous chemical bond is formed between the support structure and the thermoplastic arm rest body. An arm rest cover is coupled to the arm rest body such that the internal cavity is enclosed by the arm rest body and the arm rest cover.

In another aspect, the present invention relates to a method of forming a thermoplastic arm rest assembly that includes forming a support structure and arranging the support structure in a mold. The method further includes molding a thermoplastic arm rest body around the support structure. A homogeneous chemical bond is created between the support structure and the thermoplastic arm rest body. An arm rest cover is coupled to the thermoplastic arm rest body.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
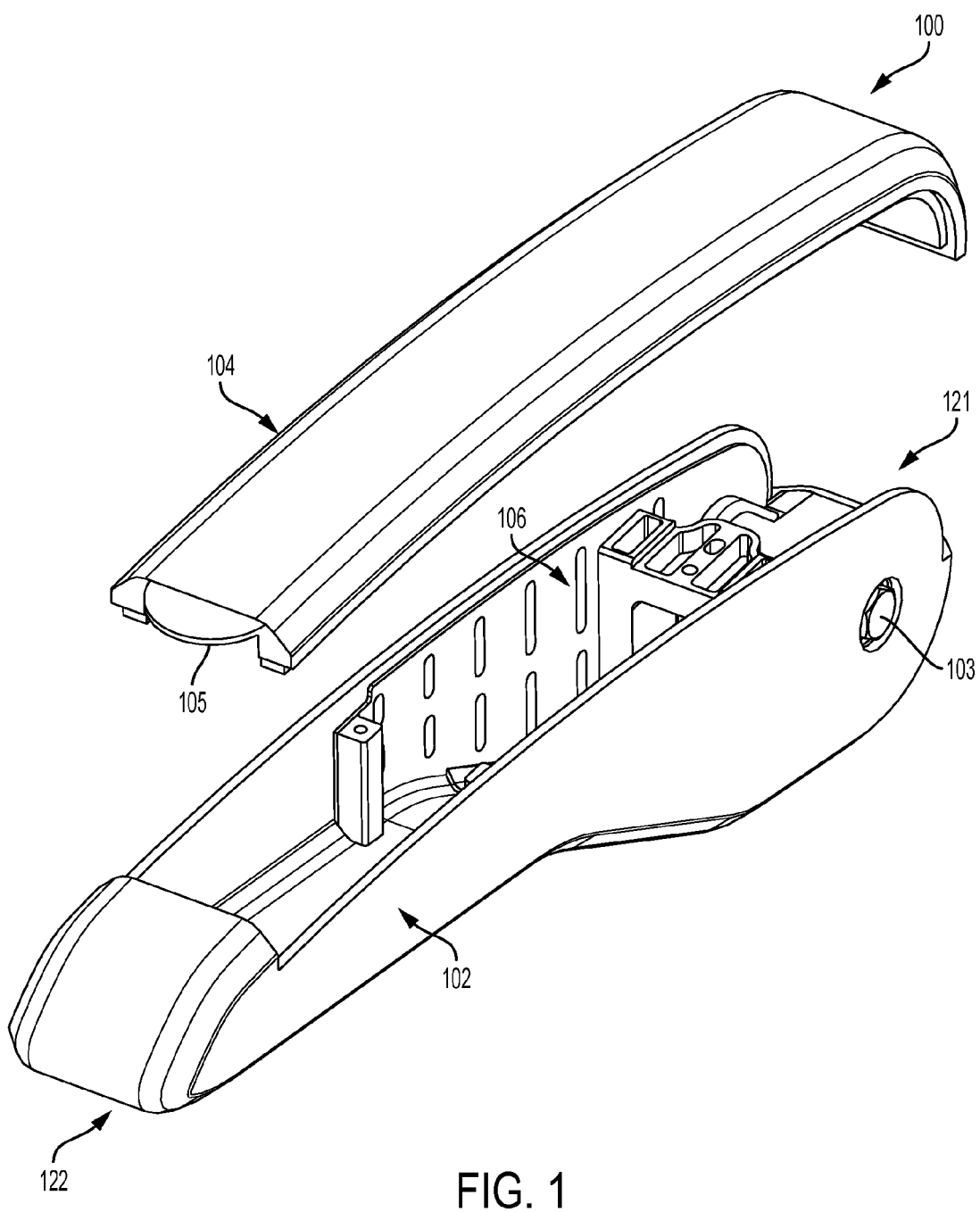
FIG. 1 is an exploded view of an arm rest assembly according to an exemplary embodiment.

Various embodiments of the present invention will now be described more fully with reference to the accompanying drawings. The invention may, however, be embodied in many different forms and should not be construed as limited to the embodiments set forth herein.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Some disclosed embodiments may generally relate to an extension of concepts of embodiments previously disclosed in related provisional U.S. patent application 61/711,567 and related U.S. non-provisional patent application Ser. No. 14/048,840, entitled Thermoplastic Injection Molded Element with Integral Thermoplastic Positioning System for Reinforced Composite Structures, filed respectively Oct. 9, 2012 and Oct. 8, 2013, and related U.S. provisional patent application 61/988,080 entitled "Seat Back" and filed May 2, 2014, which are co-owned and hereby incorporated by reference to the extent it does not contradict the express disclosure herein. More specifically, disclosed embodiments may relate to arm rest assembly embodiments which may in some instances be formed using composite materials or thermoplastic molded materials such that disclosed embodiments might be a specific application or modification of the previous provisional patent technology.

Disclosed embodiments generally may relate to a Thermoplastic Seat Arm Rest Assembly utilized in the commercial aerospace industry comprised of an integral formed thermoplastic encapsulated carbon or glass reinforced composite element with an injection molding reinforced thermoplastic support structure, further integrated into a thermoplastic injection over-molded arm rest body element providing a thermoplastic homogenous assembly.

Such arm rest embodiments may be further comprised of thermally formed and consolidated thermoplastic encapsulated unidirectional or weave carbon or glass reinforcing fiber composite configured to meet the minimum load requirement of the arm rest assembly. Such arm rest embodiments may be further comprised of thermoplastic injection molded carbon or glass chopped fiber reinforced support structures which are injection molded and homogenously attached to the thermoplastic encapsulated unidirectional or weave carbon or glass reinforced composite structure.

In some embodiments, the integral thermoplastic support structure may further be comprised of application specific support rib structures, mounting features and threaded insert mounting bosses. Such support structure embodiments may further be comprised of integral injection molded thermoplastic positioning system spire elements that provide repeatable positioning of said support structure to an injection mold tool cavity during the injection over-mold process, providing a repeatable consistent positional placement of said thermoplastic encapsulated reinforced fiber composite integral to the arm rest body thereby ensuring consistent load requirement performance.

Furthermore, in some embodiments, such support structure embodiments may further comprise a plurality of apertures provided through at least one wall section of the thermoplastic encapsulated reinforced fiber composite. Such apertures may provide a pathway for thermoplastic resin material of the arm rest body over-mold process to flow through and about the thermoplastic reinforced composite and injection over-molded arm rest body providing additional connective homogenous elements.

In some embodiments, the arm rest assembly may be further comprised of an integral thermoplastic injection over-mold process, integrating said thermally formed thermoplastic encapsulated reinforced composite with integral thermoplastic injection molded support structure elements to the arm rest assembly body element creating a homogenous attachment at all interface/mating surfaces and/or through said apertures of the support structure. In some embodiments, the thermoplastic injection over-mold process may further be comprised of the thermoplastic injection over-mold material encapsulating at least a portion of thermoplastic composite support structure, or fully encapsulating the thermoplastic composite support structure entirely, based upon the requirement of the given application.

Such thermoplastic seat arm rest assembly embodiments may comply to FAR 25.853 and OSU55/55, with integral formed thermoplastic encapsulated uni-directional or weave carbon or glass reinforced composite element integrated with a thermoplastic injection molded carbon or glass chopped fiber reinforced support structure and integral thermoplastic positioning spire elements and a thermoplastic injection overmolded arm rest body element providing a high strength-to-weight ratio assembly that meets the minimum performance requirements of the application.

Some disclosed embodiments may be comprised of chemical and molecular compatible thermoplastics resins throughout the assembly, creating an infinite number of homogenous connective attachments that provide additional consistent strength, dimensional stability and rigidity.

Some disclosed embodiments may provide increased mechanical load bearing capabilities provided by the integral formed thermoplastic carbon or glass reinforced composite element with the integral injection molded carbon or glass fiber reinforced thermoplastic support structure by the infinite number of homogeneous connective interfaces.

In some embodiments, the integral formed thermoplastic encapsulated carbon or glass reinforced composite element may comprise multiple weave patterns, multiple layers and layer orientations to provide the optimum performance for the requirement load application.

Disclosed embodiments generally relate to seat arm rest assemblies, for example to be used with seat assemblies for aircraft. In some embodiments, the arm rest assembly may comprise a support structure integral to an arm rest body, wherein the arm rest body provides the outer casing of the arm rest assembly created during an over molding process. Typically, disclosed elements of a support structure within an arm rest assembly may comprise one or more layers of composite material. For example, the elements of the support structure might comprise a composite element having one or more layers of composite material. Each layer of composite material typically has reinforcing fibers such as, for example, a weave of reinforcing fibers located internally, with thermoplastic surrounding it. In a typical embodiment, the composite material typically would only have reinforcing fibers located internally, for example in a central plane. When multiple layers of composite material form the elements of assembly, the multiple layers of composite typically would be thermally and/or homogeneously joined or otherwise consolidated together to form a unitary structure with homogeneous connective interface throughout. Typically, the one or more layers of composite material may be shaped into the form of the elements of the arm rest assembly, configured to attach to an airline seat back assembly. Typically, the one or more layers of composite material may be shaped into the form of at least a portion of the arm rest assembly, parallel and internal to the outer surface geometry of the arm rest assembly.

In some embodiments, one or more of the elements of the arm rest assembly might be injection molded onto the composite material, and since the elements typically would be formed of the same thermoplastic as the composite material, the elements typically would be thermally or homogeneously attached/affixed to the composite material. Specific embodiments related to the figures will be discussed in more detail below.

For example, composite material typically may comprise an array of reinforcing fibers such as, for example, carbon, graphite, glass, or aramid. The reinforcing fibers typically include carbon microscopic crystals aligned parallel to the longitudinal axis of the carbon fibers such as, for example, aligned in a precise orientation, and a thermoplastic material located about the array of reinforcing fibers. The array of fibers may be a weave pattern such as, for example, a five harness satin weave, in some embodiments, while in other embodiments the array of fibers may be aligned uni-directionally in a parallel linear pattern. In some embodiments, the composite might be provided in pre-defined or pre-formed solid three dimensional geometries, such as a solid sheet, which can then be shaped according to the needs of the specific element such as, for example, by heat forming or cutting. Since such a composite material typically may be a rigid solid at room temperature and only softens sufficiently to allow shaping such as bending or twisting at elevated temperatures, there would typically be no need for an external frame to hold the composite in the desired shape and/or position while forming encapsulating thermoplastic about the composite using injection molding in order to form any desired additional element. In other words, once the composite sheet material is shaped as desired for the particular support structure and has cooled to room temperature, it is a rigid solid that will independently hold the shape in question, and should not need any framework to hold its shape within the mold for forming thermoplastic elements onto the composite.

In other embodiments, the composite material might be formed by layering thermoplastic film and reinforcing fiber cloth or weave, which would then be consolidated such as, for example, via heat or compression into a unitary composite material with reinforcing fibers located between two thermoplastic layers. For example, each composite material layer might comprise two thermoplastic film layers sandwiching or surrounding a layer of reinforcing fiber. The one or more layers of composite might then be placed on a press mold for the shape of an arm rest support structure, with the press mold then being used to consolidate the one or more layers of composite, thereby forming the composite support structure for use with an arm rest assembly.

So typically, the array of fibers of the composite material would be located near the center of the composite material, with thermoplastic material located atop and beneath the array of fibers. In other words, a single layer or single ply of the composite material would typically have all of the reinforcing fibers located in a single/central plane, with the rest of the thickness of the composite material being formed of thermoplastic material; and multi-layer or multi-ply composite elements would typically have several layers or plies, each comprised of reinforcing fibers located in a single/central plane, with the rest of the thickness being formed of thermoplastic material. The centrally located reinforcement of each adjoining layer or ply may be independent to the adjacent adjoining layer or ply. Each centrally located reinforcement layer or ply might have an equal volume of thermoplastic located atop and beneath the array of fibers, providing a consistent dimensional separation between the reinforcing array of fibers. Regardless, the composite typically might provide approximately consistent fiber distribution throughout the element, so that it can provide precise and consistent/reproducible structural and/or mechanical support.

FIG. 1 illustrates an exemplary arm rest assembly 100 comprising an arm rest body 102 and an arm rest cap 104. The arm rest cap 104 may fit onto the arm rest body 102 to enclose the interior of the arm rest body 102. Typically, the arm rest cap 104 might be attached in place atop the arm rest body 102 by mechanical attachment means such as, for example screws, or by adhesive or other bonding techniques. Additionally, the arm rest cap 104 may comprise a cushioning element or other similar cosmetic features located on, for example, the top surface. The arm rest assembly 100 may also comprise a support structure 106 attached to the arm rest body 102. In some embodiments, the arm rest body 102, or a portion of the arm rest body 102 may be molded or overmolded to the support structure 106, thereby forming the joint/unified arm rest body assembly. The support structure 106 typically includes carbon reinforced thermoplastic laminate material such as, for example, composite material forming a composite structure. In some embodiments, the support structure 106 may be formed of the carbon reinforced thermoplastic material such as, for example, composite material, for example using techniques as described above, and the arm rest body 102 may be overmolded onto the support structure 106. The arm rest body 102 may, in a typical embodiment, comprise a thermoplastic material with a resin compatible with the resin of the support structure 106 such as, for example, typically the thermoplastic of the arm rest body 102 would be the same as the thermoplastic of the composite of the support structure 106 so that overmolding may result in homogenous connections. In some embodiments, the support structure 106 may be held within the mold such that the arm rest body 102 is molded to one side of the support structure 106, for example not fully covering at least portions of the support structure 106. In some embodiments, portions of the support structure 106 may be fully encapsulated by the material of the arm rest body 102. In yet other embodiments, the entire support structure 106 may be encapsulated by the material of the arm rest body 102.

As shown in FIG. 1, the support structure 106 may fit within a cavity of the arm rest body 102, wherein the cap 104 may attach to the arm rest body 102 to cover or enclose the cavity. In some embodiments, the cap 104 may also comprise a support structure 105 such as, for example, with the cap 104 having an exterior thermoplastic overmolded onto an inner support structure. The support structure 105 might be formed of composite materials similar to the support structure 106 of the arm rest body assembly.

In some embodiments, the arm rest body 102 may comprise a pivot point 103, wherein the arm rest body 102 may attach to a seat back or other structure at the pivot point 103. In the embodiment shown, the arm body 102 may comprise a back end 121 and a front end 122, wherein the back end 121 is proximate to the pivot point 103. In some embodiments, the support structure 106 may also be located proximate to the pivot point 103. In such an embodiment, the pivot point 103 may form an opening though the support structure 106 and the arm rest body 102. Typically, the support structure 106 provides support for the pivot, since forces typically would be transmitted down the length of the arm rest body 102 to the pivot point 103 during use of the arm rest 100. In the embodiment of FIG. 1, the support structure 106 may be located along only a portion of the length of the arm body 102 such as, for example, only in the back end 121.

Figure 2:
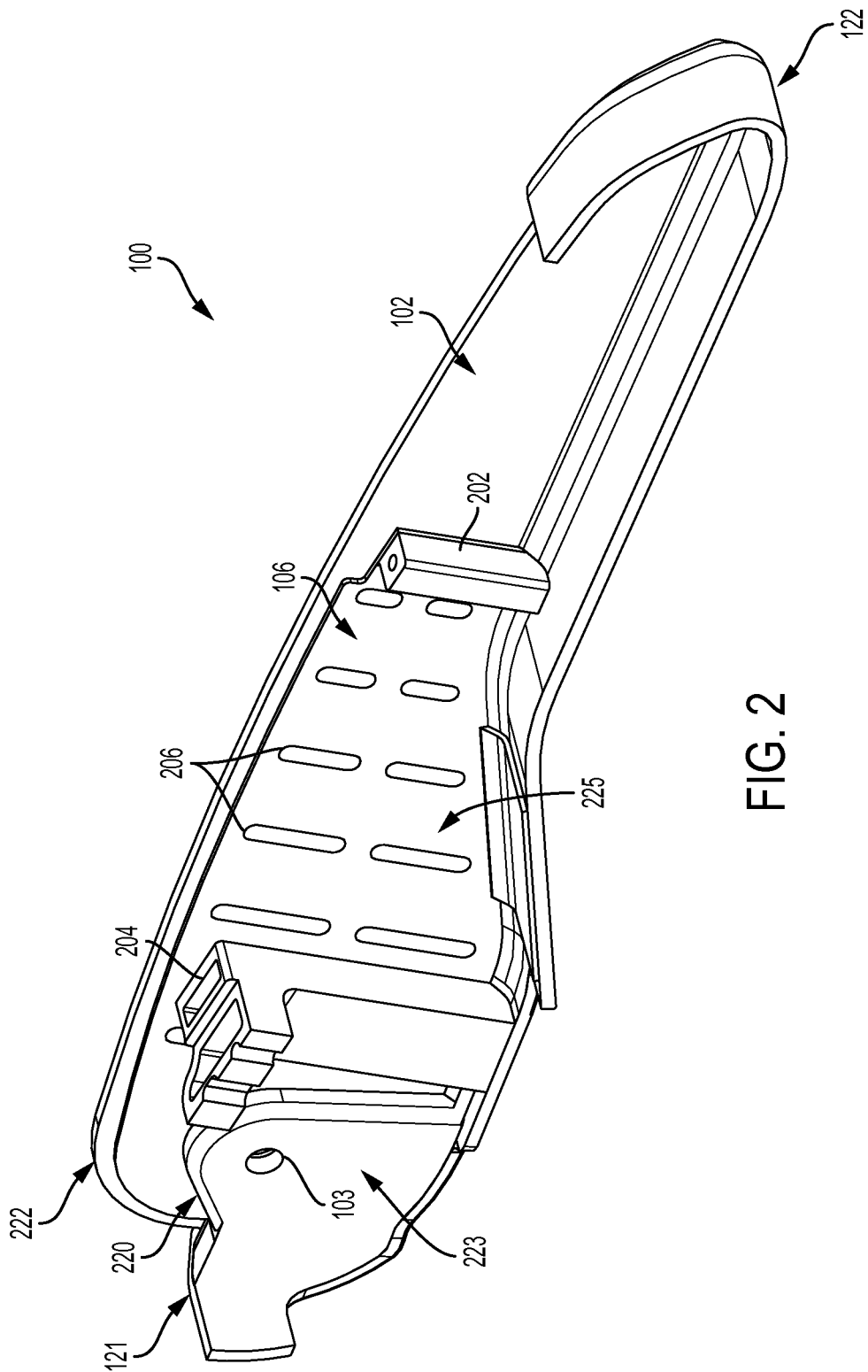
FIG. 2 is a cut away view of an arm rest assembly according to an exemplary embodiment.

FIG. 2 illustrates a cut-away view of the arm rest assembly 100 of FIG. 1, comprising an arm rest body 102 and support structure 106. The support structure 106 may optionally further comprise one or more support elements 202 and 204 which may be molded to the support structure 106 such as, for example, to the portions of the support structure 106 formed of composite—the composite structure. In some embodiments, the support elements 202 may comprise support ribs, mounting features, and/or threaded insert mounting bosses, among other support or mounting features. In some embodiments, the support structure 106 may also comprise one or more apertures 206. The apertures 206 may in some embodiments be cut out of the support structure material 106 after the support structure has been formed. In some embodiments, when the arm rest body 102 is overmolded onto the support structure 106, the material of the arm rest body 102 may at least partially fill the apertures 206 of the support structure, providing both homogenous attachment of the material of the arm rest body 102 and the material of the support structure 106, as well as potentially a mechanical interlocking of the elements. In some embodiments, a portion 220 of the support structure 106 may be molded between two portions 222 and 223 of the arm rest body 102. In other words, in some embodiments, at least a portion 220 of the support structure 106 may be fully encapsulated by the arm rest body 102. In the embodiment of FIG. 2, another portion 225 of the support structure 106 may be molded to the arm rest body 102 on only one side and possibly through the apertures 206 such that the interior surface of the portion 225 might not have any encapsulating thermoplastic.

In some embodiments, the support structure 106 may be formed and shaped from a sheet of composite material such that the support structure 106 comprises a composite structure. In some embodiments, the composite material may comprise a unidirectional or weave carbon or glass reinforced composite material as described above. Then, support elements 202 and 204 may be molded on the support structure 106, wherein the material of the support elements may comprise a thermoplastic material that is chemically compatible with the thermoplastic material of the support structure 106, allowing for homogenous attachment of the support elements 202 and 204 to the composite structure of the support structure 106. In some embodiments, the support elements 202 and 204 may further comprise chopped carbon reinforcing fibers with the reinforcing fibers located in the thermoplastic resin when the support elements are molded onto the composite structure. Then, the support structure 106, which may now be molded to include one or more support elements 202 and 204, may be inserted into a mold and overmolded with the arm rest body 102 forming the thermoplastic exterior of the arm rest body assembly. The material of the arm rest body 102 may comprise a thermoplastic material that is chemically compatible with the thermoplastic material of the support structure 106 such as, for example, the composite structure and/or support elements 202 and 204, allowing for homogenous attachment of the arm rest body 102 to the support structure 106. In a typical embodiment, the thermoplastic resin used to form the arm rest body 102 would be the same as the thermoplastic material of the composite structure or support elements of the support structure 106, allowing for homogenous connection.

Figure 3:
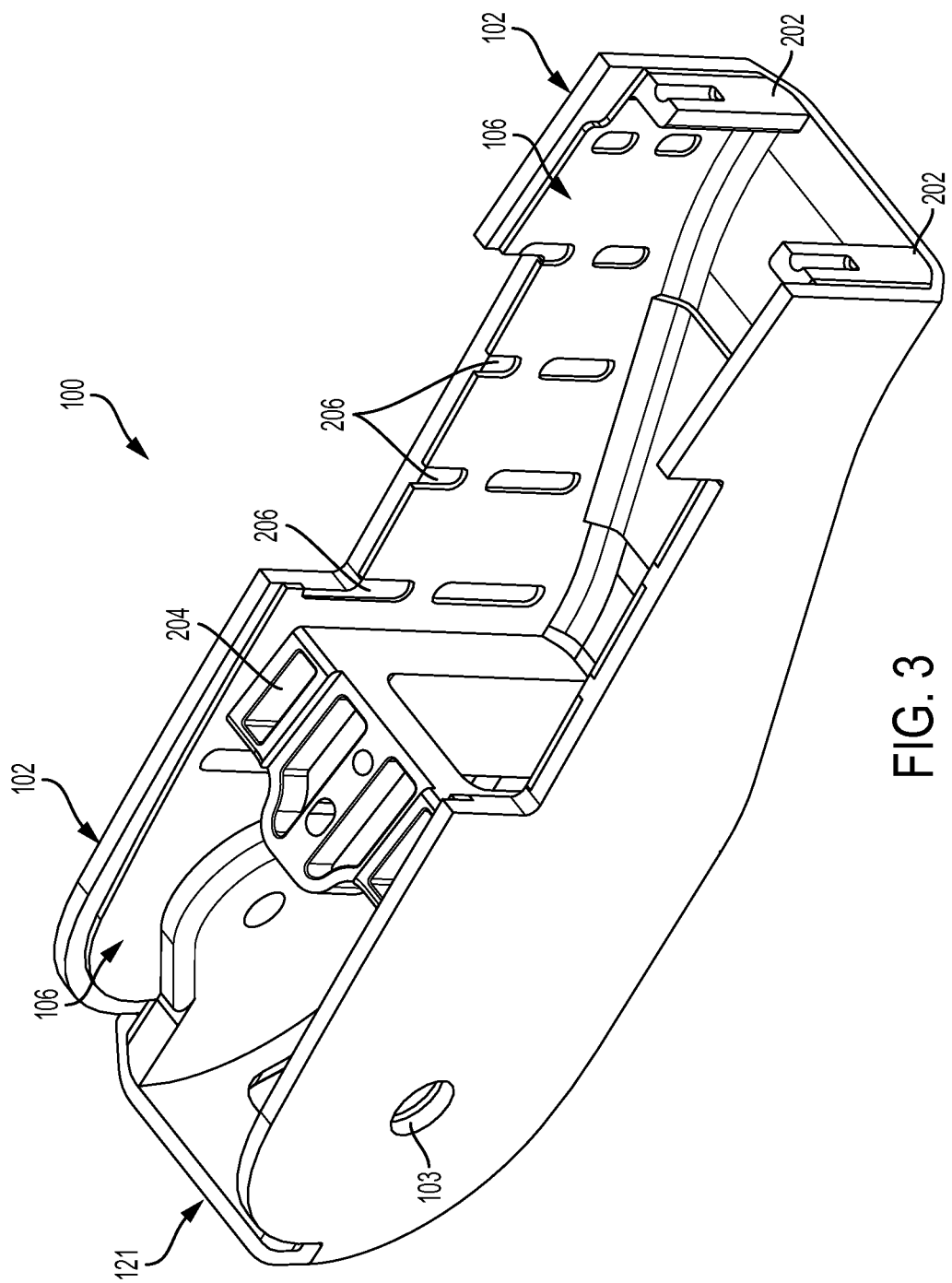
FIG. 3 is a cut away view of a rear portion of an arm rest assembly according to an exemplary embodiment.

FIG. 3 illustrates another cut-away view of the back portion 121 of the arm rest assembly 100 comprising a support structure 106, with support elements 202 and 204, and an arm rest body 102. In FIG. 3, the apertures 206 of the support structure 106 may be filled by the material of the arm rest body 102. However, while the apertures 206 of the support structure 106 are filled in FIG. 3 forming mechanical interlock as well as additional homogenous connection between the support structure 106 and the arm rest body 102, in FIG. 3 the encapsulating thermoplastic of the arm rest body 102 does not extend to cover the interior surface of the portion of the support structure 106 having the aperture. That is, the arm rest body 102 only covers the exterior of the support structure 106 for at least that portion.

Figure 4:
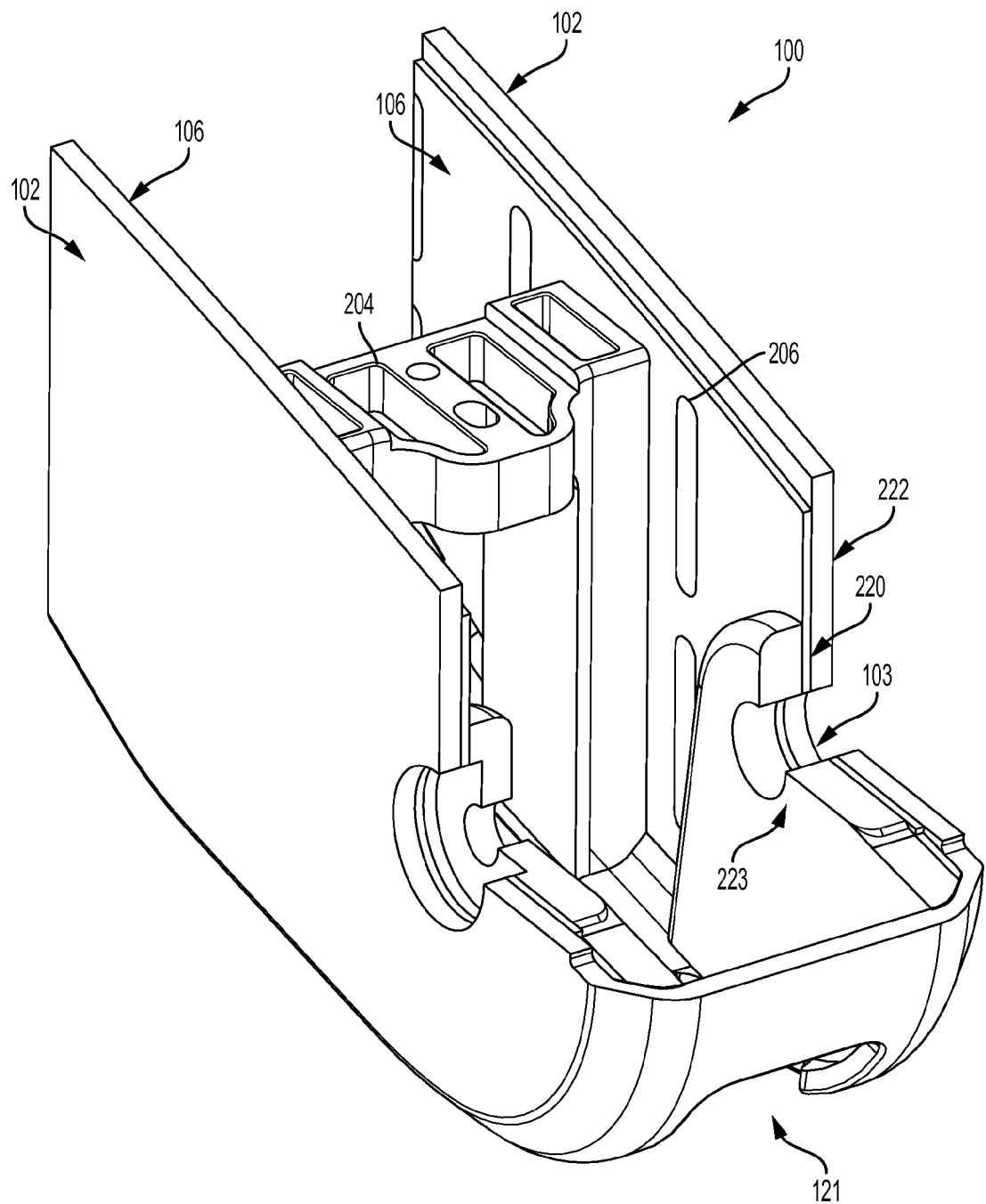
FIG. 4 is a rear cut away view of an arm rest assembly according to an exemplary embodiment.

FIG. 4 illustrates yet another cut-away view of the back portion 121 of the arm rest assembly 100 of FIG. 1. FIG. 4 shows a more detailed view of the back portion 121 of the arm rest assembly 100 around the pivot point 103. Additionally, the portion 220 of the support structure 106 that is molded between two portions 222 and 223 of the arm rest body 102 may be seen in more detail.

Figure 5:
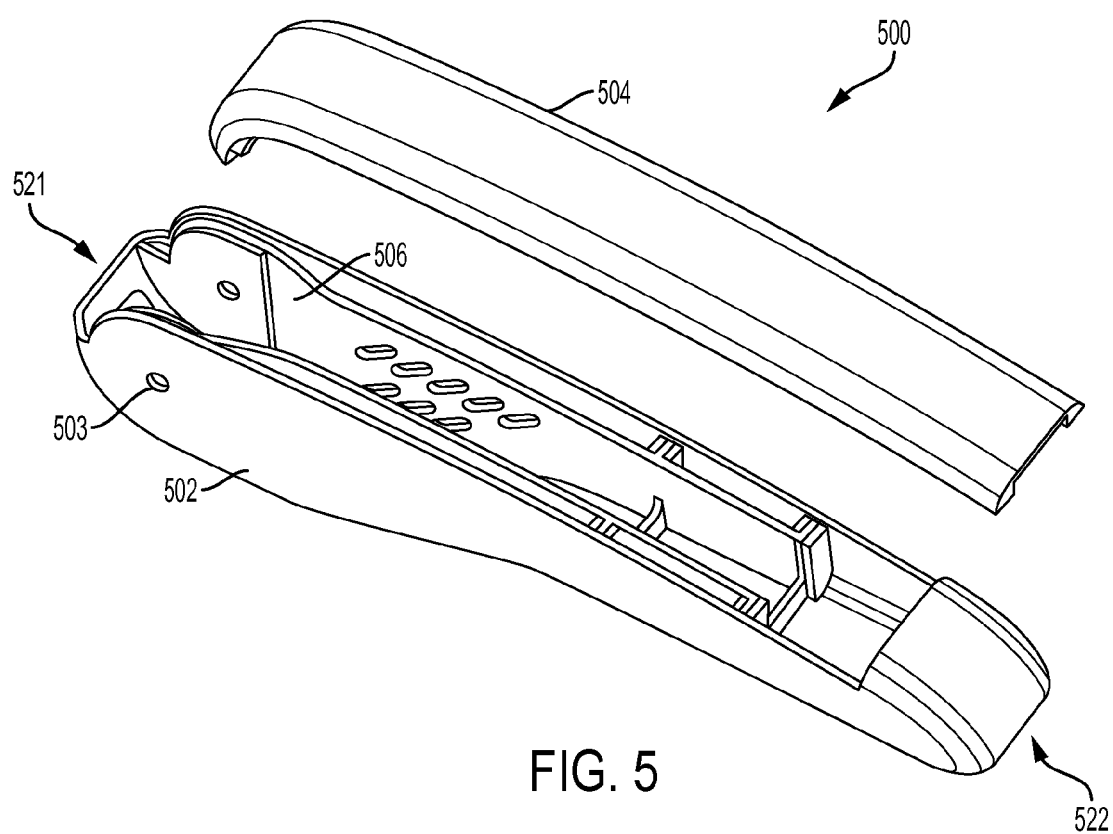
FIG. 5 is an exploded view of an arm rest assembly including a support structure according to an exemplary embodiment.

FIG. 5 illustrates another embodiment of an arm rest assembly 500 comprising a support structure 506, an arm rest body 502 and a cap 504. The embodiment of FIG. 5 may be similar in many ways to the embodiment of FIG. 1, although there are distinctions which will be apparent from the figures and description below. Similarly, the arm rest assembly 500 may comprise a pivot point 503, a front end 522 and a back end 521. The embodiment of FIG. 5 illustrates an alternative design for the support structure 506 which is at least partially encapsulated by the arm rest body 502.

Figure 6:
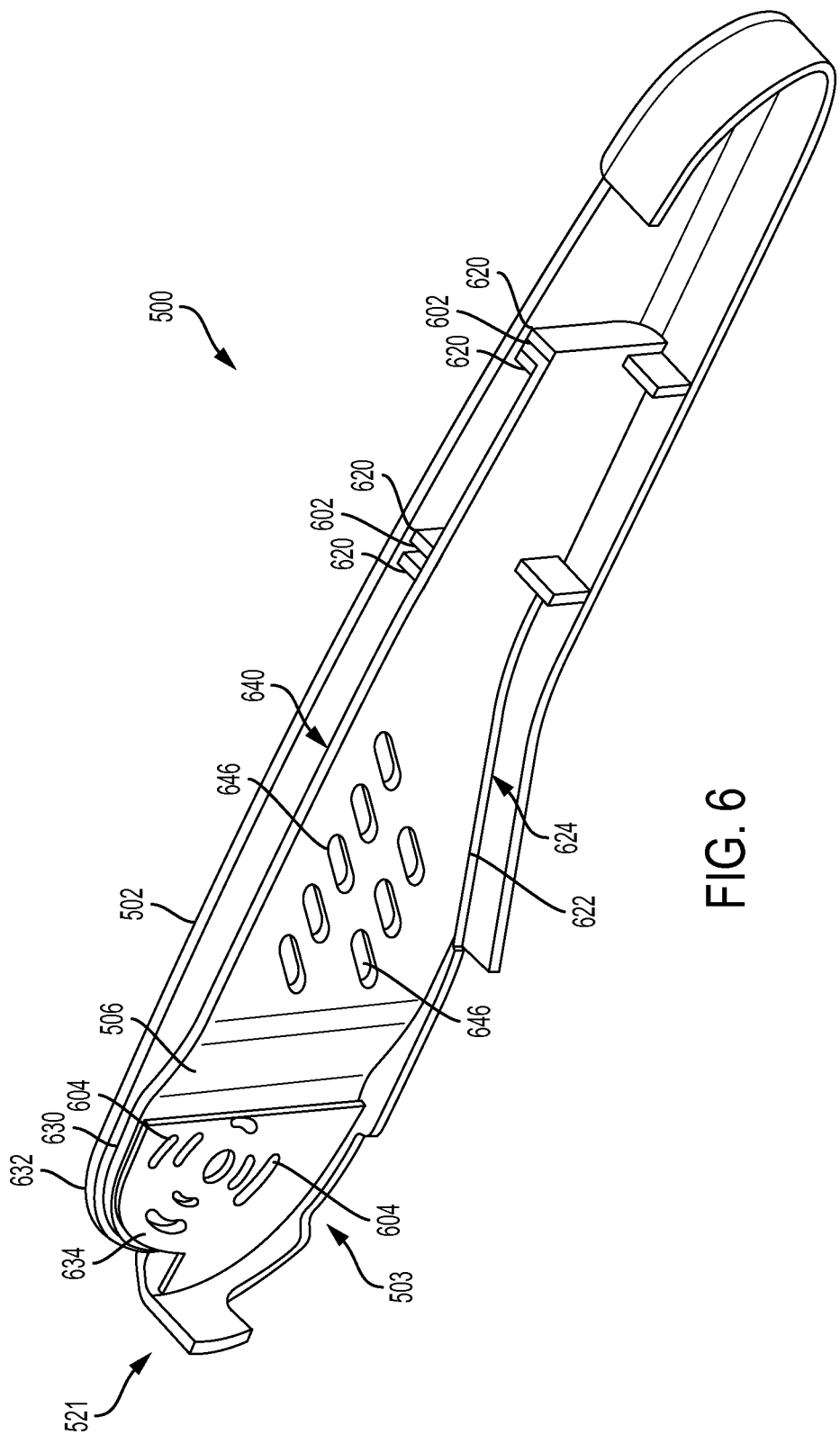
FIG. 6 is a cut away view of the arm rest assembly of FIG. 5 according to an exemplary embodiment.

FIG. 6 illustrates a cut-away view of the arm rest assembly 500 of FIG. 5. In some embodiments, the support structure 506 may comprise support elements 602. In the embodiment of FIG. 6, the support structure 506 may comprise apertures 604 through at least a portion 630 of the support structure 506. In some embodiments, the portion 630 of the support structure 506 may relate to the back end 521, or that portion 630 of the support structure 506 may be fully encapsulated by portions 632 and 634 of the arm rest body 502, wherein the material of the arm rest body may fill the apertures 604 of the support structure 506 and fully encapsulate portion 630 of the support structure 506. In the embodiment of FIG. 6, the portion 630 of the support structure that is fully encapsulated is located at the back end 521 or surrounds the pivot point 503. In some embodiments, the support elements 602 of the support structure may be at least partially encapsulated by portions 620 of the arm rest body 502. In some embodiments, the support structure 506 may comprise one or more grooves 622, wherein a least a portion 624 of the arm rest body 502 may be molded into the groove 622 as, for example, a mirror image. In some embodiments, a portion 640 of the support structure 506 may optionally comprise apertures 646. In FIG. 6, a portion 640 typically might include an angled surface, angled inward from the exterior arm rest body 502 such as, for example, to position the support structure 506 to provide strength as needed by the design. In some embodiments, the features illustrated in the cut-away view of FIG. 6 may be duplicated on the removed half of the support structure 506 and arm rest body 602.

Figure 7:
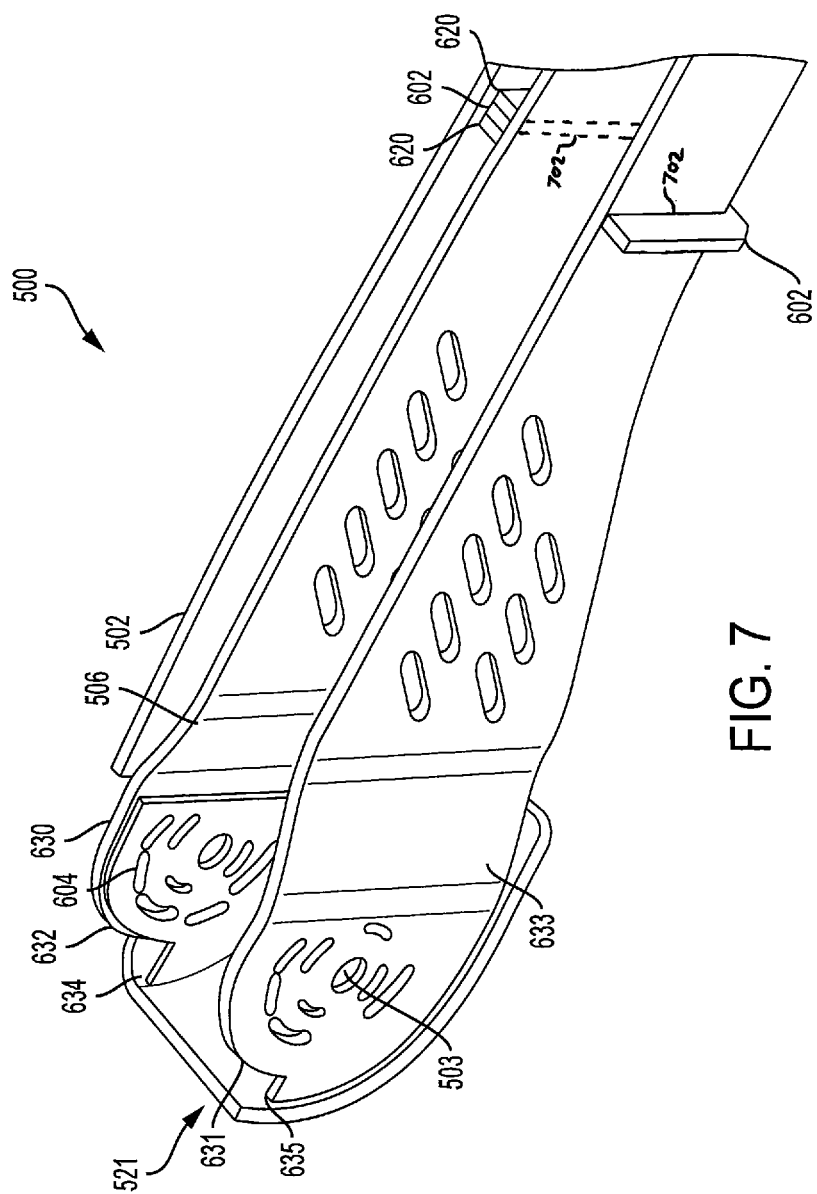
FIG. 7 is a cut away view of a rear portion of the arm rest assembly of FIG. 5 according to an exemplary embodiment.

FIG. 7 illustrates a cut-away view of the back portion 521 of the arm rest assembly 500 comprising a support structure 506, with support elements 602, and an arm rest body 502. As illustrated in FIG. 7, an additional portion 631 of the support structure 506 may comprises apertures 604 and may be fully encapsulated by portions 633 and 635 of the arm rest body 502, similar to portion 630 of the support structure 506. In the embodiment of FIG. 7, the support element(s) 602 may comprise aperture(s) 702 through at least a portion of the support element 602, wherein the material encapsulating portions 620 which may be molded around the support element 602 may fill the apertures 702 during molding such as, for example, providing additional mechanical interlocking and homogenous connection.

Figure 8:
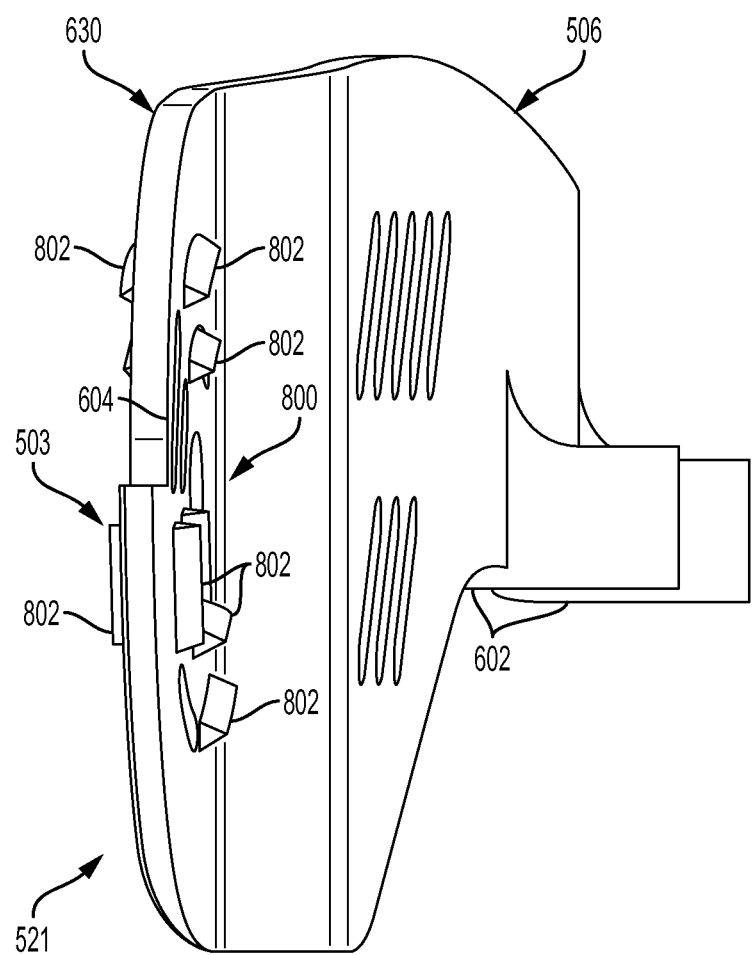
FIG. 8 is a detailed view of a support structure according to an exemplary embodiment.

FIG. 8 illustrates a more detailed cut-away view of the support structure 506, viewed from the end 521. In the embodiment of FIG. 8, the support structure may comprise an integrated thermoplastic positioning system (ITPS) 800 molded onto at least a portion of the support structure. In the embodiment shown, the ITPS 800 may be molded onto the portion 630 of the support structure 506 which may be fully encapsulated by the arm rest body 502 as described above. The ITPS 800 may comprise one or more spires 802 and typically a plurality of spires. The spires 802 may be operable to hold the portion 630 of the support structure 506 in place within a mold during the overmolding of the arm rest body 502 onto the support structure 506. In the embodiments shown, the spires 802 may be placed in a circular pattern about the pivot point 503 of the support structure 506 and arm rest assembly. In other embodiments, the ITPS 800 may comprise spires 802 in other locations on the support structure, wherein the spires may be operable to support the support structure 506 within a mold. In some embodiments, the spires 802 may help prevent the support structure 506 from moving within the mold when liquid material is injected into the mold such as, for example, the material of the arm rest body 502 described above. The spires 802 and the ITPS 800 typically include the same thermoplastic material as the composite structure of the support structure 506. The overmolded material may bond with the spires 802 along with other surfaces of the support structure 506 and/or support elements 602 during the molding process to provide a homogenous attachment of the arm rest body 502 to the support structure 506.

Figure 9:
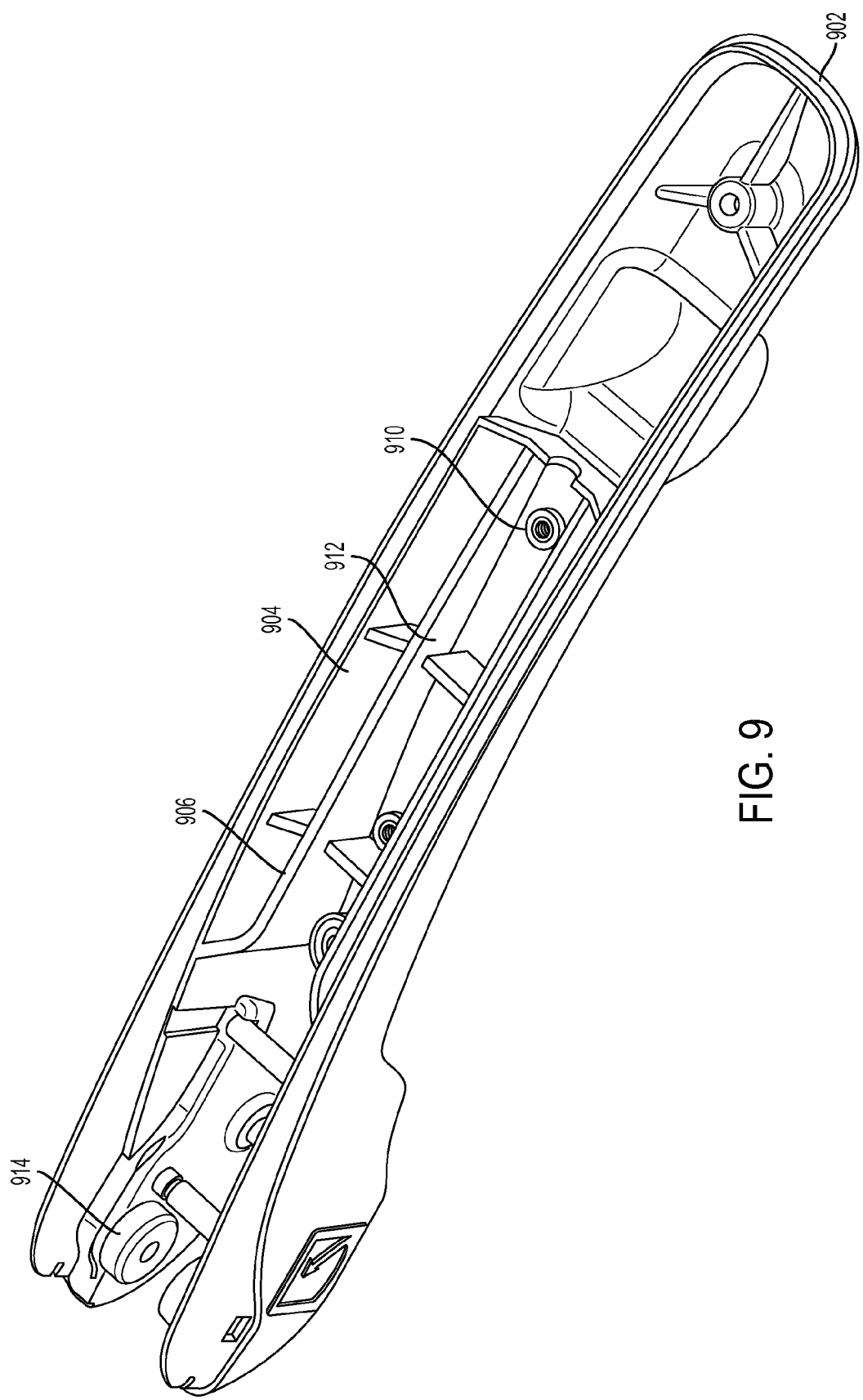
FIG. 9 is a perspective view of an arm rest body with an arm rest cushion removed according to an exemplary embodiment.

FIG. 9 is a perspective view of an arm rest body 902 with an arm rest cover removed. The arm rest body 902 has a support structure 904 disposed therein. The support structure 904 includes a plurality of longitudinal ribs 906 which longitudinal ribs are oriented generally parallel to a long axis of the arm rest body 902. In a typical embodiment, the plurality of longitudinal ribs 906 enhance strength of the arm rest body 902. In a typical embodiment, the support structure 904 is constructed of a thermoplastic material having a plurality of reinforcing fibers disposed therein. The reinforcing fibers may be, for example, chopped carbon fibers, glass fibers, or other appropriate reinforcing fiber as dictated by design requirements. In other embodiments, the support structure may be, for example, injection molded and not include reinforcing fibers. In various embodiments, the support structure 904 includes metal stop pins 908 and mounting features 910. The mounting features 910 include, for example, threaded inserts disposed therein. In a typical embodiment, the threaded inserts are coupled to the mounting features 910 via, for example, ultrasonic welding.

Still referring to FIG. 9, the support structure 904 includes a plurality of apertures 912 formed therein. In a typical embodiment, the apertures 912 are formed in the sides and bottom of the longitudinal ribs 906. During manufacturing, the support structure is placed into a mold such as, for example, an injection mold tool and a chemically compatible thermoplastic resin is molded onto the support structure to form the arm rest body 902. The thermoplastic resin flow through the apertures 912 in the support structure 904 and thereby facilitates creation of a homogeneous chemical bond between the support structure 904 and the arm rest body 902. As shown in FIG. 9, the support structure 904 is completely encapsulated by the arm rest body 902 in the vicinity of a pivot point 914; however, the support structure 904 is exposed at positions forward from the pivot point 914. During molding of the arm rest body 902, lateral ribs 916 are formed that connect one side of the arm rest body 902 to the opposite side of the arm rest body 902 between the longitudinal ribs 906. In a typical embodiment, the lateral ribs 916 are homogeneously connected to the arm rest body 902 and the support structure 904. In a typical embodiment, the lateral ribs 916 resist torsional loading of the arm rest body 902.

For example, exemplary thermoplastic support elements typically might comprise a thermoplastic material that is the same chemical composition as that of the composite. In some embodiments, the thermoplastic support elements may also be reinforced with suitable fibers, for example carbon and/or graphite and/or glass and/or aramid fibers dispersed within the thermoplastic resin material during injection molding of the thermoplastic support elements onto the composite sheet material structure. The thermoplastic support elements may be thermally or homogeneously affixed (connected) to the composite sheet material structure, for example by chemical bonding (of the sort that might occur by injection molding the thermoplastic support elements onto the composite sheet material structure, for example). This may form a homogeneous connective interface, such that the arm rest as a whole may be an integral unit bonded solidly together in a way that may enhance the overall strength of the arm rest.

In some embodiments, the composite material of the arm rest may be multi-layered (for example, formed of two or more layers of composite). This layering of composites may provide for additional structural support for the element. While some embodiments may require multi-layered composite support throughout the element, in other embodiments one or more layers of composite may be used for most of the element, with additional layer(s) used only in critical areas of the element requiring greater structural support (for example, around the pivot point 503 and/or at portion 630 towards the back end 521). Typically, the multiple layers of composite may be securely affixed (for example, fused together, as by ultrasonic welding, thermal staking, thermal welding, consolidation, homogeneously affixed, or other such joining means). In some embodiments, the multiple layers of composite may be oriented so that the reinforcing fibers of each layer are oriented differently. By altering the fiber orientation of the layers, the joint composite may provide additional strength in some embodiments.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. In the claims, any designation of a claim as depending from a range of claims (for example #-##) would indicate that the claim is a multiple dependent claim based of any claim in the range (e.g. dependent on claim # or claim ## or any claim therebetween). Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the inventions) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. An arm rest assembly comprising:
   a thermoplastic arm rest body that defines an internal cavity;
   a support structure disposed within the internal cavity, the support structure being chemically compatible with the thermoplastic arm rest body such that a homogeneous chemical bond is formed between the support structure and the thermoplastic arm rest body, the support structure comprising a plurality of apertures formed through the support structure, the plurality of apertures allowing transmission of thermoplastic material through the support structure and facilitate formation of a homogeneous chemical bond between the thermoplastic arm rest body and the support structure; and
   an arm rest cover coupled to the arm rest body such that the internal cavity is enclosed by the arm rest body and the arm rest cover.

2. The arm rest assembly of claim 1, comprising a pivot point formed in a rear aspect of the thermoplastic arm rest body.

3. The arm rest assembly of claim 1, comprising an integrated thermoplastic positioning system disposed within the thermoplastic arm rest body to position the support structure.

4. The arm rest assembly of claim 1, wherein the support structure is at least partially encapsulated by the thermoplastic arm rest body.

5. The arm rest assembly of claim 4, wherein the support structure is completely encapsulated by the thermoplastic arm rest body.

6. The arm rest assembly of claim 1, wherein the support structure comprises a plurality of longitudinal ribs that extend generally parallel to the arm rest body.

7. The arm rest assembly of claim 6, wherein the support structure comprises a plurality of lateral ribs that extend perpendicular to the longitudinal ribs.

8. The arm rest assembly of claim 1, wherein the support structure comprises a thermoplastic laminate having a plurality of reinforcing fibers arranged therein.

9. The arm rest assembly of claim 8, wherein the composite thermoplastic laminate comprises a unidirectional weave of reinforcing fibers.

10. The arm rest assembly of claim 8, wherein the plurality of reinforcing fibers are chopped carbon fibers.

* * * * *